United States Patent [19]
Schwartz

[11] Patent Number: 6,075,888
[45] Date of Patent: Jun. 13, 2000

[54] SYSTEM FOR CREATING A DEVICE SPECIFIC COLOR PROFILE

[75] Inventor: Michael Schwartz, Billerica, Mass.

[73] Assignee: Eastman Kodak Company, Rochester, N.Y.

[21] Appl. No.: 08/585,082

[22] Filed: Jan. 11, 1996

[51] Int. Cl.[7] .................................................. H04N 1/60
[52] U.S. Cl. ........................ 382/167; 358/504; 358/518; 358/523
[58] Field of Search ................................... 358/504, 518, 358/520, 522–525; 382/167; 395/109, 101, 131; H04N 1/60

[56] References Cited

U.S. PATENT DOCUMENTS

| | | | |
|---|---|---|---|
| 5,452,112 | 9/1995 | Wan et al. | 358/504 |
| 5,491,568 | 2/1996 | Wan | 358/518 |
| 5,537,516 | 7/1996 | Sherman et al. | 395/109 |
| 5,594,557 | 1/1997 | Rolleston et al. | 358/504 |
| 5,760,913 | 6/1998 | Falk | 358/504 |

*Primary Examiner*—Kim Yen Vu
*Attorney, Agent, or Firm*—Peyton C. Watkins

[57] ABSTRACT

A system that allows a user to tune a designated a color profile for a specific color input or output device thereby creating a device specific profile from a profile for a similar device or from a generic device profile. The color values associated with the device, either patches input to a scanner or patches output by a display or a printer, are measured using a colorimetric color measuring device. These measured values are used to adjust or tune the profile to produce a more accurate profile for the particular device. The adjustment includes curve fitting the measured color values and simulated color values to create a mapping from the measured values to the simulated values. The curve is used to adjust the profile. To account for gamut shifts the color values can be mapped into the gamut of the device during tuning curve creation.

7 Claims, 6 Drawing Sheets

SYSTEM FOR CREATING A DEVICE SPECIFIC COLOR PROFILE

BACKGROUND OF THE INVENTION

1. Field of the Invention

The present invention is directed a system for converting a device generic or base profile that is applicable to a family of color devices into a profile for a specified device, and, more particularly, to a system that uses the base profile to generate color outputs for a device, colorimetrically measures the color of the color outputs and adjusts the profile to more accurately characterize the device.

2. Description of the Related Art

The field of color device analysis can be divided into several different areas:

characterization, calibration, and correction. A device can be corrected to remove the effects of distortion caused by the device. In this operation the behavior of the device is compared to the behavior of an "ideal" device and is adjusted until it becomes ideal. Calibration consists of putting the device into a known state. In calibrating a device, the device is adjusted so that a series of known inputs produces a set of predetermined outputs, called an "aim curve".

Once a device is in a known state, it can be characterized. Of course a device can be characterized even when it has not been calibrated. Characterization consists of describing the actual colorimetric behavior of a device. This description is typically accomplished by measuring the colors of patches produced by known inputs to the device, and then fitting the measurements to some sort of model for the device.

Device characterization is important because it allows people to convert between different device color spaces. For example, consider a person who wishes to scan in a picture, view the picture on a monitor, and then write out the picture on an ink-jet printer. To do this in such a way that the original picture, monitor image, and printed copy look the same, it is necessary to convert between the color spaces defined by the RGB measured by the scanner, the RGB used by the monitor, and CMYK used by the printer.

To facilitate the use of device characterizations, color management systems have been developed by a number of companies. These color management systems use what are called device profiles to describe the colorimetric properties of devices. Each profile contains transformations between the device color space and a profile connection space (PCS). One common PCS is CIELAB, but other CIE spaces such as uvL and XYZ have also been used.

These device profiles are commonly produced in a format developed by the Intercolor Consortium, and described in the document "ICC Profile Format Specification" ©International Color Consortium 1995. This document is incorporated by reference herein. It is also available on the internet at the anonymous ftp site maintained by Silicon Graphics Inc., sgigate.sgi.com in the directory ~ftp/pub/icc. An ICC device profile contains a transform from the profile connection space to the device space and a transformation from the device space to the PCS. In addition, profiles for output devices contain a simulation transform which maps from the PCS to the PCS and describes how out of gamut colors are mapped into the gamut of the output device before being printed.

Currently there are two ways for an individual user to get a device profile for a given device. The first is to obtain an existing profile. The advantage of this method is that the user, without investing much time or effort, gets a profile which has been prepared by skilled engineers using highly accurate equipment. On the other hand a pre-made profile cannot allow for individual variation between different devices of the same type. This is particularly a problem in the case of devices, such as printing presses or color film writers, where the color production process is inherently unstable.

The second current method of obtaining profiles is for the user to create them from nothing. Creating a profile involves writing a large set of patches at fixed ink values, measuring those patches, and then using an application which makes use of the measurements to create the profile. Typically this process requires measuring an extremely large set of patches. Currently available products require the measurement of anywhere from 200 to 400 individual color patches. The analysis of these measurements also takes a long time on the types of computers which are available to most people. Furthermore, the process can be extremely sensitive to errors in the measurements. Because of the large number of patches which have to be measured, these errors can easily be due to human error, as well as being due to the measurement noise associated with low-cost color measurement instruments. Furthermore, because of the large amount of time it takes to make the required measurements, it is not practical to track process variation by constantly recomputing output profiles.

What is needed is a way of combining the advantages of both approaches by creating a more accurate profile or characterization from an existing profile.

U.S. Pat. No. 4,500,919 by Schreiber describes a method in which an iterative process is used to determine ink lookup table values. In Schreiber's method one computes the CMY values expected for a given set of RGB inputs, prints those values, measures the resulting RGB and "adjusts the LUT entries according to the error in CMY" (13,31). However it is not clear from Schreiber's description how the LUT is to be adjusted or how this adjustment effects the handling of out of gamut colors described by the simulation transform. U.S. Pat. No. 4,658,286 to Schwartz describes a system similar to Schreiber's in that adjustments are made to an output to correct measured distortions caused by the device. However, Schwartz does not say anything about how to modify the simulation transform or how to deal with the fact that changes in the colorimetry of an output device will result in changes in the output gamut for the device.

What is needed is a system that will consider the changes in the gamut of a device.

SUMMARY OF THE INVENTION

It is an object of the present invention to provide a method and an apparatus for improving the accuracy of device color profiles.

It is also an object of the present invention to improve the accuracy of the profile through a small number of device measurements.

It is a further object of the present invention to provide improved input and output profiles for color devices.

It is another object of the present invention to allow a user to convert a generic profile into a specific device profile.

It is an additional object of the present invention to allow the creation of a profile that can be used to track process variations in a device.

It is an object of the present invention to allow the creation of a device specific profile from an existing profile for a similar device.

The above objects can be attained by a system that allows a user to designate a profile for a device. The color values produced by the device using the profile are measured. These measured values are used in a curve fitting procedure to produce a tuning function that is used to adjust or tune the existing profile to produce a more accurate profile for the particular device.

These together with other objects and advantages which will be subsequently apparent, reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

The present invention is an apparatus and method for adjusting output device profiles. In general the user starts by selecting a base profile which comes close to characterizing the target output device. The user then uses the invention to write out a set of patches, each of which was produced by converting a pre-determined color value into the output device's color space using the base output profile. The user measures each of these patches using any color measurement instrument. The invention then uses the measurements to create a tuning function that is used to adjust the output profile so that it more accurately characterizes the device. A variation of this process can also be used to adjust the black channel for a four-color output device. A different variation of the process can be used to adjust a profile for an input device.

The present invention combines the advantages of both approaches discussed previously by providing the ability to use a small set of measurements to correct a base profile. A user could buy a generic device profile then tune it for a specific device. Alternately the user could spend a long time creating a custom device profile, but then use frequent tuning as a way of tracking short term variations in the device. Because this invention does not produce the device profile from scratch, the measurements used by the invention do not have to provide the same amount of information used for determining the color reproduction properties of the device and therefore the measurements do not have to be as numerous. Furthermore, the types of mathematical modeling required to interpret the measurements can also be simpler than for a process requiring a complete description of the behavior of the device. For these reasons the present invention is faster and easier to use than currently existing methods for creating output profiles.

Figure 1:
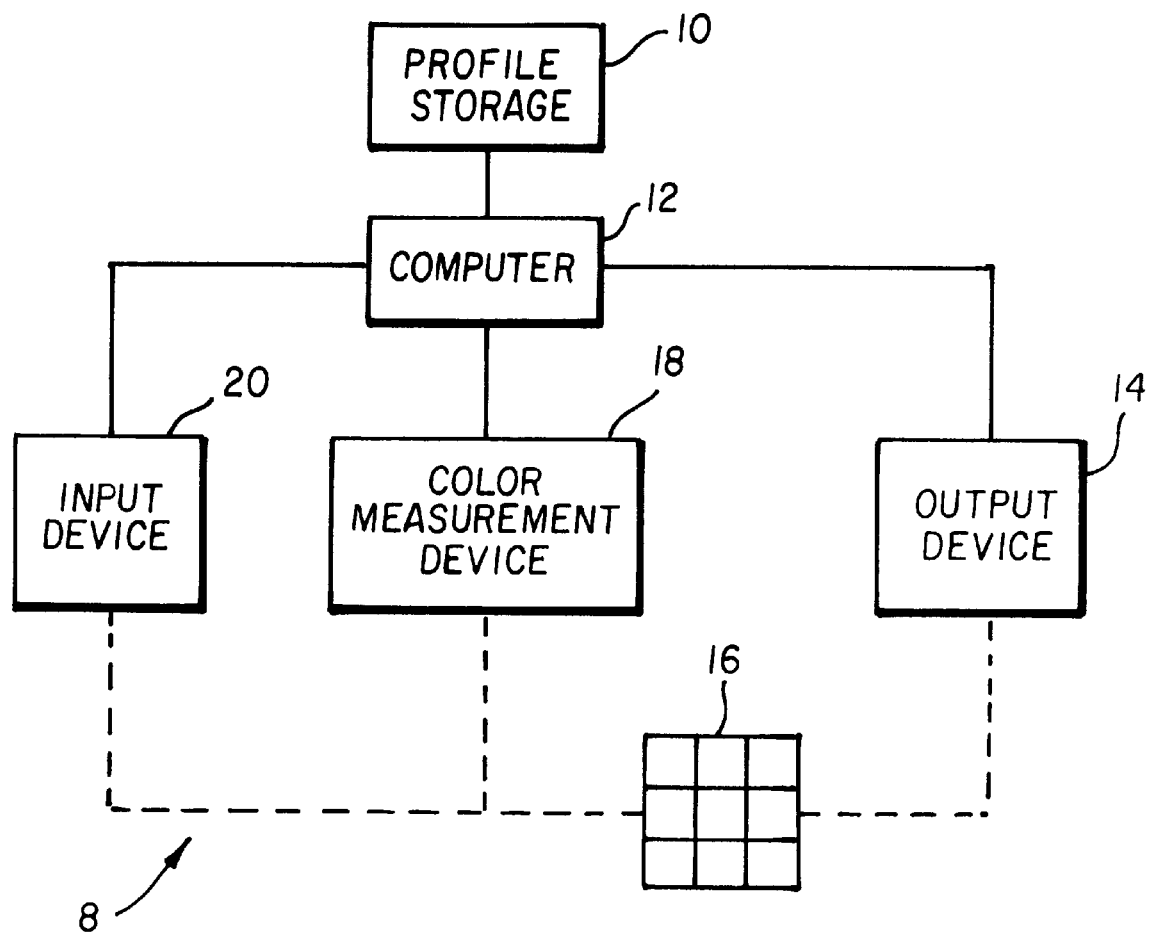
FIG. 1 depicts the components of the system of the present invention.

The present invention is directed to a system 8 that can include the components as illustrated in FIG. 1. Profile storage 10, which can be in the form of a floppy disk, optical disk, magnetic disk, RAM, etc., provides a previously existing or base profile to a computer 12, such as a conventional desk top computer. Assuming that an output device 14 is the device for which a custom profile is being created, the computer 12 causes the output device 14 to produce a limited number of color patches 16 using the existing profile by driving the output device with appropriate color signals. The output device 14 can be a printer or a display or some other output device. The color of the patches is read or measured using a conventional color measurement device 18, such as a spectrophotometer, the X-Rite DTP-51 strip colorimeter, the LightSource Colortron hand held colorimeter or a color scanner, such as the Microtek flatbed calorimeter scanner. The colors of the color patches are then used by the computer 12 to create a new profile from the preexisting profile in accordance the process described in detail below. The new profile can then be stored in the storage 10 or used to perform color operations. If an input device 20, such as a one of the flatbed scanner previously mentioned, has a profile that needs to be tuned, the system starts with a set of color patches (16) whose color values are known. The patches are read by the input device 20 and used with the preexisting profile for that device by the computer 12 to create a tuned or adjusted profile.

Figure 2:
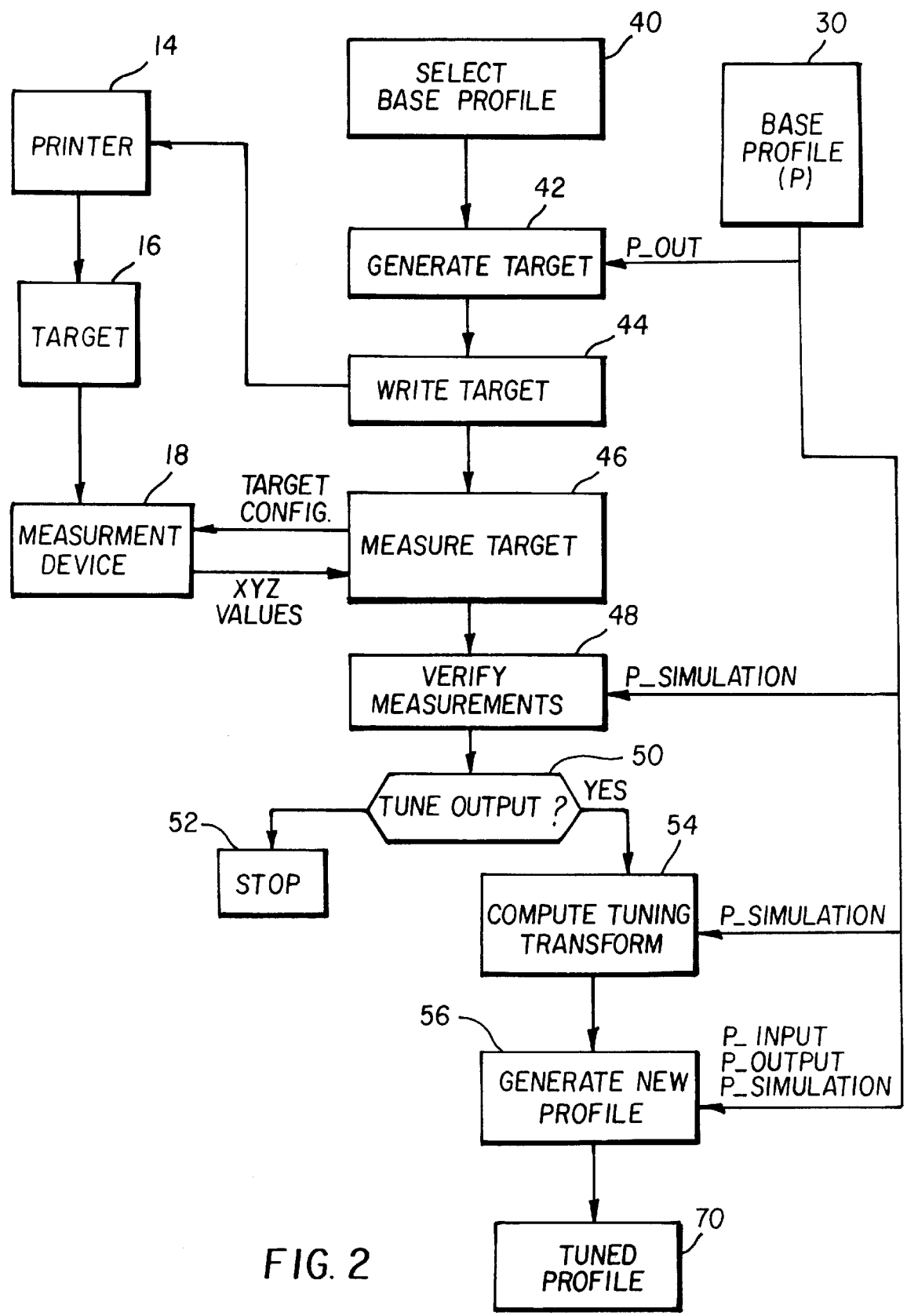
FIG. 2 depicts the flow of operations in accordance with the present invention.

In creating a new tuned profile for the output device 14, such as a printer, the present invention requires, as illustrated in FIG. 2, that a base profile 30 be selected 40. A base output profile P contains within it three color-space transformations:

P_Out: Lab→ink output transform used for generating inking for a given color

P_In: ink→Lab input transform which gives the color which would be produced for a given inking P_Simulation: Lab→Lab simulation transform which predicts how a given color will be rendered Computing a new profile Pnew means computing new transformations Pnew_Out, Pnew_In, and Pnew_Simulation.

The next step, after selecting the base profile is to generate 42 color values or signals for a target. The target includes nominal color values chosen to provide a reasonable level of coverage of the Lab color space. In general, the more color values the better, however, a large number becomes impractical. All of the targets preferably contain two populations of patches. The first is a set of gray patches. These are evenly spaced in terms of their nominal L* values and go from black to white. The second is a set of colored patches. Some attempt should be made to distribute these evenly in Lab, although their distribution need not be completely even. In addition there should be relatively more patches in the pinks, yellows, and browns, so as to cover the flesh region. The patches of the generated target are, written 44 using the base profile 30. If $c_i$=the nominal color for the i'th patch then the inking used for actually writing that patch is P_Out($c_i$). The number of patches depends on the type of color measurement device being used as part of the invention. The system writes out a 30 patch target for use with conventional hand-held calorimeters. This target contains 10 gray patches, whose brightness runs from black to white and 20 colored patches. The target intended for use with a commercially available strip calorimeter has 75 patches, 25 grey and 50 color. For flat bed scanners the target preferably contains 100 patches, 15 gray and 85 colored, and should include a black background to reduce flare.

After the target is written out on the intended output device 14 the color patches are measured 46. How the measurements take place depends on the nature of the particular calorimeter 18 being used with the device 14 and is implementation dependent. If the calorimeter is a hand held calorimeter, the system preferably prompts the operator before each measurement; if the calorimeter contains a method for measuring multiple patches without human intervention, the computer 12 sends signals to the calorimeter describing the target size and shape. The color measurement can also be a properly characterized color scanner. In such a case the measurement process consists of scanning the target extracting the patch values from the scanned data by taking averages and converting the scanned values into colorimetric values using the input profile for the scanner.

Once the measurements have been made they can be verified 48 by comparison to their expected values. If the profile is completely accurate the measured values for each patch should equal the values predicted by the simulation transform and a decision 50 is made to stop 52.

If the measured values do not substantially match the expected values, the next step is computing 54 a tuning transform F. It is also possible to automatically generate the tuned profile without the check of step 48. Once the tuning transform is produced, it is used to generate 56 a new tuned profile 70, that is, compose the existing and tuning transform. It is also possible to use the tuned profile as the base profile for another one or two cycles of improvement. More than one or two additional cycles generally will not provide substantial further improvements.

The discussion below includes a number of formulas the functions of which can be provided using a conventional mathematics software package, such as MATLAB.

The tuning transform F is a transformation which maps Lab→Lab. Its purpose is to remap colors in such a way that applying the output transform to the remapped colors produces a more accurate characterization of the device. Its use can be seen more clearly from the description which follows. (Note—in the discussion below, the notation F•G refers to the process of chaining together or composing two color transformations F and G so that the result is equivalent to applying F to a color and then applying G.)

Let F be a tuning transform, or color move which is used to tune the output profile P to produce (see step 56 in FIG. 2) a new profile Pnew. Then the transforms of Pnew are related to the transforms of P by $$Pnew\_Out = F \cdot P\_Out \qquad (1)$$

$$Pnew\_In = P\_In \cdot F^{-1} \qquad (2)$$

$$Pnew\_Simulation = F \cdot P\_Simulation \cdot F^{-1} \qquad (3)$$

The third equation (3) is a consequence of the fact that we wish to preserve the relationship $$P\_Simulation = P\_Out \cdot P\_In \qquad (4)$$

Note that one consequence of the third equation is that out of gamut colors will be compressed differently by the tuned transform.

To understand how to derive F from the patch measurements, consider the following. Let Model be a function which maps a color value to the color value produced by writing out the color through the base profile and measuring it. In other words $$c = \text{an Lab value} \qquad (5)$$

Model(c)=the Lab value measured from a patch written with ink values given by $$P\_Out(c) \qquad (6)$$

Ideally Model(c)=P_Simulation(c) for all c. In practice, because of defects or inaccuracies in the profile, this will not be the case. We can, however try to remap the input colors so that writing out the remapped color through the profile gives a value which is predicted by the new simulation:

$$\text{Model}(F(c)) = Pnew\_Simulation(c) \qquad (7)$$

or $$F \cdot \text{Model} = F \cdot P\_Simulation \cdot F^{-1} \qquad (8)$$

$$\text{Model} \cdot F = P\_Simulation \qquad (9)$$

The individual color value measurements are the sample points for the Model function. Let $c_i$ be the input color which was used to produce the i'th patch, and $meas_i$ be the value which was measured from the i'th patch. Then it must be true that $$\text{Model}(c_i) = meas_i \qquad (10)$$

Therefore the function F should be chosen to come as close as possible to satisfying $$F(meas_i) = P\_Simulation(c_i) \text{ for all } i. \qquad (11)$$

The basic procedure for determining F is to pick a parameterization for F and determine values for those parameters which minimize the color difference between $F(meas_i)$ and $P\_Simulation(c_i)$. That is, pick a type of curve for F and determine the coefficients of the curve. The process of estimating the parameter values can be done using standard regression or curve fitting techniques.

The above-discussed procedure needs to be modified to allow for differences in the output gamut between the base profile and the actual device. These differences are quite likely since one of the things which can vary is the inks used in the device. The change of gamut can be taken into account in the following way:

Let G:Lab→Lab be a mapping which takes the nominal device gamut into the actual device gamut. Then the equations for the remapped input and simulation transforms become $$Pnew\_In = P\_In \cdot F^{-1} \cdot G \qquad (12)$$

$$Pnew\_Simulation = F \cdot P\_Simulation \cdot F^{-1} \cdot G \qquad (13)$$

The second equation comes from the fact that the old input transform is mapping ink values into the old gamut. The equation for the model then becomes $$F \cdot \text{Model} = F \cdot P\_Simulation \cdot F^{-1} \cdot G \qquad (14)$$

or $$(\text{Model} \cdot G^{-1}) \cdot F = P\_Simulation \qquad (15)$$

This means that allowing for changes in the output gamut means that the function F should be chosen to come as close as possible to satisfying $$F(measG_i) = P\_Simulation(c_i) \text{ for all } i \qquad (16)$$

Where $$measG_i = G^{-1}(meas_i) \qquad (17)$$

Once the parameters for the functions F and G are determined the system can apply the tuning transform to obtain the new profile.

Figure 3:
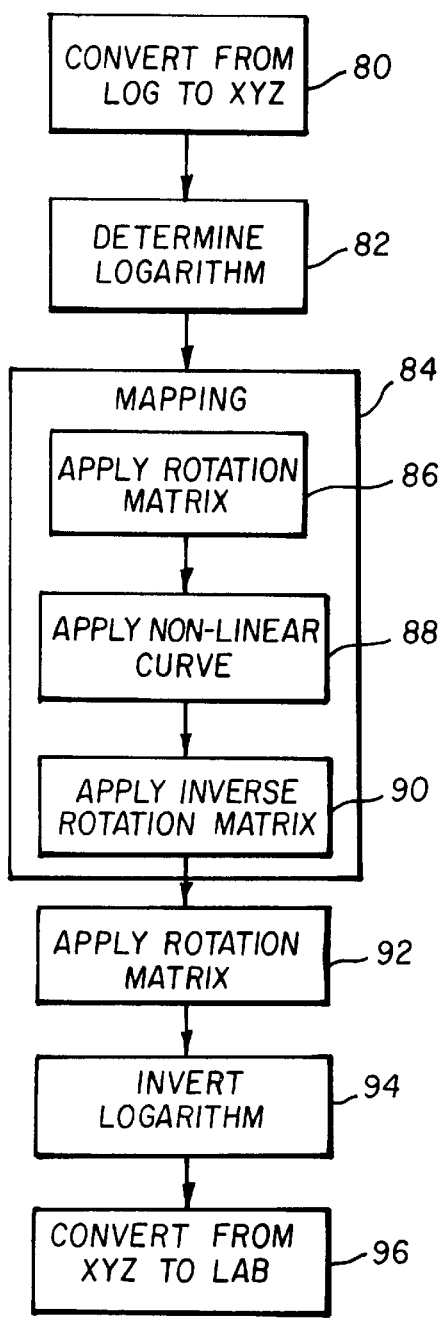
FIG. 3 illustrates the steps of tuning the points of a transform.

For the preferred embodiment, the application of the tuning transform includes a series of transformations on each color. These transformations amount to a non-linear mapping followed by a rotation in log tristimulus space. The transformations include the following steps depicted in FIG. 3.

1) Conventionally convert 80 from Lab to normalized XYZ (ie XYZ normalized to white).
2) Take 82 the conventional logarithm, slightly modified to avoid singular behavior at 0.
3) Apply 84 a non-linear mapping which includes the following:
   a) Rotate 92 the colors.
   b) Apply 86 a separate non-linear function to each of the three components;
   c) Rotate 90 back to the original color axis.
4) Rotate 92 the colors.
5) Conventionally convert 94 back to linear normalized XYZ.
6) Conventionally convert 96 to Lab.

Symbolically, this can be written

F(c)=c: (Lab→Norm XYZ)•LogM•Matc•Curve•Matc$^{-1}$•Mat•LogM$^{-1}$•(NormXYZ→Lab) Each of the individual functional components or operations noted above are described in detail below.

The conversion from the Lab color space to normalized XYZ is performed in the standard way:

$$X = H^{-1}(L^*/100 + a^*/500)$$

$$Y = H^{-1}(L^*/100)$$

$$Z = H^{-1}(L^*/100 - b^*/200)$$

where $$H(t) = \begin{cases} 9.033 * t & \text{if } t < .008856 \\ 1.16 * t^{1/3} - .16 & \text{if } t > .008856 \end{cases}$$

The LogM function is applied separately to each color component. It is defined by Log M(x)=log (x) if x>0.001  2*log (0.001)−log (2*0.001−x) if x>0.001 (18)

Note that this is an ordinary logarithm above 0.001. Below that value it is a log which has been reflected around 0.001. The advantage of this curve over a standard logarithm is that it goes smoothly through 0. Note too that the computation of a profile involves computing grid points which are outside the spectral locus, so a function which can deal with negative XYZ values is important.

In step 3(a) the three components of each color are multiplied by a 3×3 matrix:

$$\text{Out}_i = \sum_j \text{in}_j * aMat_{j,i} \quad (19)$$

This matrix determines which primaries are compressed by the nonlinearity The matrix is defined to leave neutrals alone. Since a neutral value in normalized XYZ is one in which all three components are equal, this requirement means that each column of the matrix sum to 1:

$$\sum_j aMAT_{j,i} = 1 \text{ for all } i \quad (20)$$

Because of this constraint, only the off-diagonal elements of aMat are allowed to vary independently. Typical values for the matrix when a three component color profile is being tuned are:

| | Matrix I | | |
|---|---|---|---|
| | First Component | Second Component | Third Component |
| X | 0.9391 | 0.5761 | 0.2003 |
| Y | −0.0736 | 0.6382 | 0.3761 |
| Z | 0.1344 | −0.2143 | 0.4236 |

The inverse application of the matrix which occurs in step 3(c) also uses the above matrix I.

In applying a nonlinear function to each of the components each component is passed through a 1-dimensional spline curve:

$$\text{Out}_i = \text{Spline}(\text{In}_i, [x_1 \ldots x_2], [y_{i,1} \ldots y_{i,x}]) \quad (21)$$

Where:

In$_i$, Out$_i$=the input and output for the i'th component

Spline(x,xTable,yTable) is a function which performs a spline fit based on two tables.

[x$_1$ . . . x$_n$] is the input table used for all three curves

[y$_{i,1}$ . . . y$_{i,n}$] is the output table used for the i'th component

The function Spline performs a conventional cubic spline fit to the table data. It computes the spline coefficients or control points in such a way that the curvature at the end points of the table is 0, and it extrapolates linearly beyond the end points of the table. The quantities [x$_1$ . . . x$_n$] are fixed. Points 0 through n−1 go from 0 (white) to LogM (minimum measured luminance), and are preferably evenly spaced in brightness. The n'th point is equal to logM(0). The quantities [y$_{1,1}$ . . . y$_{i,n}$] are parameters which determine the curve. They are computed as part of the regression procedure which determines the retuning function F. Because it is desirable that the retuning function map white to white, Y$_{i,0}$ is always 0. Similarly it is necessary to constrain the n'th point to go through black by constraining y$_{i,n}$=LogM(0). The reason for constraining white is to make sure that Lab=[100, 0,0] maps to white paper. The reason for keeping the n'th point fixed is that the data for the dark colors are too undependable to allow them to determine the lowest end point. The number of spline points per color is given by n=min(7, (number of neutral points)/2+1)

The reason for the number of neutral patches to limit the number of spline parameters is that the neutral patches have a dominant influence on the values of the spline parameters.

In step 4 a final rotation is performed. Its main purpose is to remap saturated colors $$\text{Out}_i = \sum_j \text{in}_j * Mat_{j,i} \quad (22)$$

The matrix is defined to leave neutrals alone. Since a neutral value in normalized XYZ is one in which all three components are equal, this requirement means that each column of the matrix sum to 1:

$$\sum_j MAT_{j,i} = 1 \text{ for all } i \qquad (23)$$

Because of this constraint, only the off-diagonal elements of aMat are allowed to vary independently Typical values for the matrix are:

Matrix II

|   | First Component | Second Component | Third Component |
|---|---|---|---|
| X | 0.8047 | −0.2150 | 0.2014 |
| Y | 0.2098 | 1.2481 | −0.3837 |
| Z | −0.0144 | −0.0331 | 1.1822 |

The total number of independent parameters used for F is $3*(n+2)$. This means that all but the smallest targets use 27 parameters. The 30 patch Colortron target uses 24 parameters (for 90 measured values).

In general many parameterizations (numbers and values of control points) for F and G are possible, especially when the curve is a spline curve. The main requirements for a parameterization of F is that it be invertible and that it be not too highly curved. The first requirement comes from the need to recompute the input and simulation transforms for the new profile. The second requirement prevents the tuning transform from being too sensitive to bad data or to an inept choice of color values for the patches.

The gamut transformation G maps colors so that the printable region predicted by the input and simulation transforms fits into the actual gamut of the device. The gamut transformation preferably used here consists of two parts. One part remaps a* and b*. It is followed by a second transformation which compresses or extends brightness.:

$$G = \text{CompressAB} \cdot \text{CompressBrightness} \qquad (24)$$

The color compression routine remaps saturation (actually chroma, here defined as $\sqrt{(a*)^2+(b*)^2}$) while preserving the angle between a* and b* (approximately the hue). It tries to do this in a way which depends smoothly on a* and b*:

$$s = \sqrt{(a*)^2 + (b*)^2} \qquad (25)$$

$$\begin{bmatrix} a* \\ b* \end{bmatrix} = gsat_{a,b}(s) * \begin{bmatrix} a*/s \\ b*/s \end{bmatrix} \qquad (26)$$

The function gsat remaps saturation as a function of a* and b*. It necessarily performs only a very approximate remapping, because the extent of the actual gamut can only be determined very roughly. It is defined in terms of rough limits in a* and b* of the measured and simulated patch values:

maxSimA, maxMeasA—maximum simulated and measured a* values
minSimA, minMeasA—minimum simulated and measured a* values
maxSimB, maxMeasB—maximum simulated and measured b* values
minSimB, minMeasB—minimum simulated and measured b* values The function gsat is defined in such a way that $$[\text{maxSimA}, 0] \to [\text{maxMeasA}, 0] \qquad (27)$$

$$[\text{minSimA}, 0] \to [\text{minMeasA}, 0] \qquad (28)$$

$$[0, \text{maxSimB}] \to [0, \text{maxMeasB}] \qquad (29)$$

$$[0, \text{minSimB}] \to [0, \text{minMeasB}] \qquad (30)$$

This is accomplished in the following way. The function gsat is defined by $$gsat_{a,b}(s) = \left(\frac{a*/s}{s}\right)^2 * fsat(s, a_0, a_1) + \left(\frac{b*/s}{s}\right)^2 * fsat(s, b_0, b_1) \qquad (31)$$

where $a_0, a_1, b_0, b_1$ depend on which quadrant a and b are located in:

$$a>0 \quad a_0=\text{maxSimA}, \ a_1=\text{maxMeasA} \qquad (32)$$

$$a<0 \quad a_0=-\text{minSimA}, \ a_1=-\text{minMeasA} \qquad (33)$$

$$b>0 \quad b_0=\text{maxSimB}, \ b_1=\text{maxMeasB} \qquad (34)$$

$$b<0 \quad b_0=-\text{minSimB}, \ b_1=-\text{minMeasB} \qquad (35)$$

Note that the form of this function allows the different assignments of $a_0, a_1, b_0, b_1$ to fit together smoothly. Finally, the function fsat(s,s0,s1) is defined to be a cubic curve which maps s0 to s1: if s0<s1

$$A = (s1 - s0)/s0^3 \qquad (36)$$

$$\text{fsat}(s) = s * (1 + A * s^2) \qquad (37)$$

if(s0≤s1)

$$A = (s0 - s1)/s1^3 \qquad (38)$$

$$\text{fsat}^{-1}(s) = s * (1 + A * s^2) \qquad (39)$$

The reason for using the cubic form is to have a function which looks like a straight line near neutral. The reason for the inverse cubic is to avoid having a function which turns over. Inverting the cubic can be done in the following steps:

$$sq = \sqrt{\left(\frac{s}{2*A}\right)^2 + \left(\frac{1}{3*A}\right)^3} \qquad (40)$$

$$\text{fsat}(s) = \sqrt[3]{sq + \frac{s}{2*A}} - \sqrt[3]{sq - \frac{s}{2*A}} \qquad (41)$$

Since A is always positive, all the terms above are positive.

The tonal compression function

CompressBrightness acts mainly on the neutral axis. Off neutral its effect falls off with saturation:

CompressBrightness: (L*, a*, b*)→(newL*, a*, b*)newL*= satfac*ComNeut(L*, Bmin)+(1-satfac)*L*  (42)

where
  satfac=exp(−s²/1000)
  Bmin=the new minimum brightness
The neutral compression function ComNeut has two parts. The first part undoes the compression performed by the simulation transform of the base profile. The second part recompresses the neutral axis so that it fits the measured dynamic range.

ComNeut(L*,Bmin)=Recompress(P_Simulation$^{-1}$ ([L*,0,0]), Bmin) \hfill (43)

The recompression function takes the form of a flare transformation:

Recompress(L*,Bmin)=normY2Bright((1− ymin)*Bright2NormY(L*)+ymin) \hfill (44)

Where normY2Bright and Bright2NormY are functions which map between brightness and normalized photopic luminance and ymin=Bright2NormY(Bmin)

The formula for ComNeut needs to be modified somewhat for values which are less than the minimum brightness obtainable using the base profile. This modification is necessary because P_Simulation is not really invertible for these low brightnesses. Even for brightnesses slightly above the old minimum brightness P_Simulation can have such a low slope that numerical methods of inverting it do not give reliable results. For this reason the following definition of CompressNeut is used for low values:

if L*<oldBmin+3 ComNeut(L*,Bmin)=$A_{Bmin}$* (L*)$^{nBmin}$ \hfill (45)

where the constants A and n are defined in such a way that the function ComNeut is constant and has constant slope. Note that with this definition ComNeut(0,Bmin)=0.

The formula for G must be modified if the output device is meant to print colors with "Colorimetric rendering intent" (see the ICC Profile Format specification") For Colorimetric rendering intent, colors in gamut must be left unchanged. Therefore, if the rendering intent is colorimetric, the function G does not modify a* and b* and sets all brightness values below the minimum brightness to the minimum brightness.

The various parameters for determining the tuning transform and gamut functions are preferably determined by non-linear search techniques which seek to minimize the color error between the measured patch values and the simulated values for those patches.

The fitting procedure needs to guard against the possibility that bad measurement values will cause the parameters to move in bad directions. It also needs to produce a good starting estimate. This is important for two reasons. First, a good starting estimate tends to reduce the number of iterations required by the fitting procedure. Second, the full parameterization of the tuning transform seems to have local minima, so that a good starting estimate makes sure that convergence occurs towards a good minimum value.

The fitting procedure preferably weights the different patch values differently. Important colors should get higher weights. Neutrals preferably get 5 times the weight of other colors, while reds get twice the weight. Patches which seem questionable should be weighted less. Dark neutrals preferably get less weight than bright neutrals. If some patches have measured values which are significantly farther from their simulated values than the other patches, those patches should get less weight. The procedure preferably determines bad patches in the following way:

1) For each patch, it computes the error in Lab between the measured value and the simulated value.
2) It computes the median color error.
3) It adjusts the weight of each patch by an error factor $$\text{errorfactor} = \text{Min}\left(1, e^{-\left(\frac{error}{medianError}-errLim\right)^2}\right)$$

with errLim=3.

The search also uses constraints as a way of preventing measurement error from pushing the parameters in undesirable directions. This is particularly true of the matrices Mat and Matc, and of the gamut compression parameters.

Figure 4:
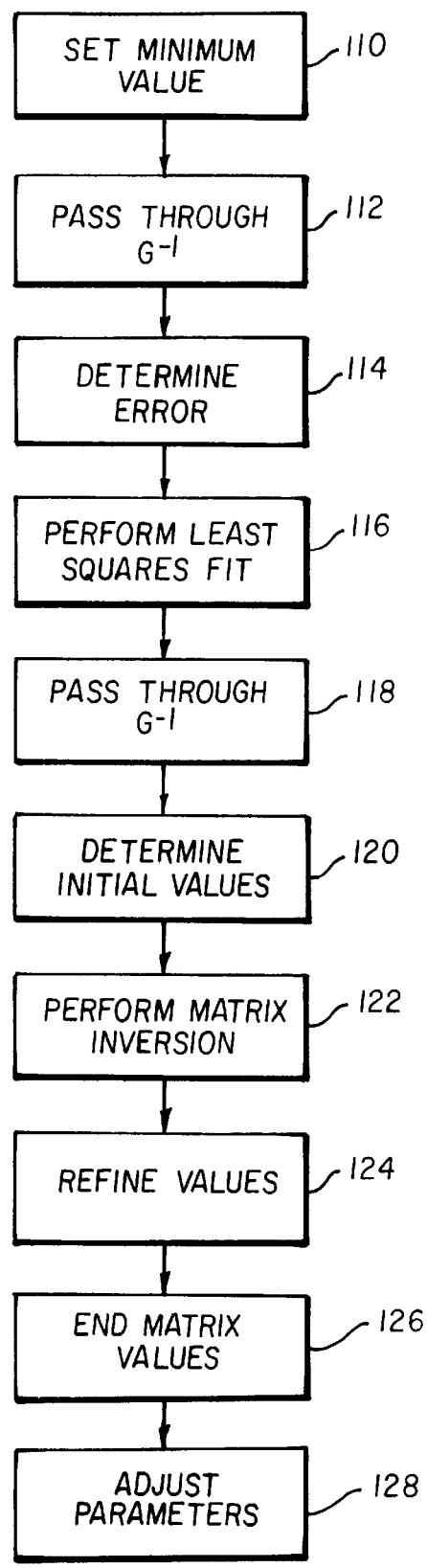
FIG. 4 depicts the steps of finding the parameters of a tuning transform.

The search takes place through the steps discussed below and illustrated in FIG. 4.

A) In the first operation the gamut function G is determined

A1) The gamut parameters maxSimA, maxSimB, minSimA, minSimB, maxMeasA, maxMeasB, minMeasA, minMeasB, and minB, are set 110 to their initial values by finding the minimum and maximum values for L*,a* and b* among the measured and simulated patch values. To guard against unreliable values, the initial values for the measured limits on a* and b* are forced to be within 10% of the corresponding simulation values.

A2) The measured values are put 112 through G$^{-1}$ using these initial parameter values. The system then determines 114 the color error between these remapped measured values and the values predicted by the simulation transform Patches having a color error which is more than three times the median value are considered bad points and are given a low weighting for all subsequent non-linear searches.

A3) Next, the final values for maxMeasA, maxMeasB, minMeasA, minMeasB, and minB are determined 116 through a least squares fit. The fit should be constrained to keep the AB limit parameters close to their corresponding simulation values.

A4) The original measured values are put 118 through G$^{-1}$ as determined by the final gamut parameters. For later steps the phrase "measured values" will in fact refer to G$^{-1}$(measured values)

B) In the next operation the tuning parameters are determined.

B1) The initial values for the curve parameters are determined 120 by fitting the measured and simulation brightness values for the neutral patches. For this initial estimate all three curves are assumed to be identical.

B2) The initial values for the final rotation Mat is determined by applying the initial estimate for Curve to the measured values, and then fitting the result in XYZ. This can be done using a simple matrix inversion 122.

B3) The initial values for Mat are refined 124 by applying the Curve function to the nonneutral patches and then minimizing the color error. The values found in the previous step are used as starting values.

B4) The initial values of Matc are found 126. In this search Matc starts out as the identity.

B5) A final non-linear search adjusts 128 the set of parameters in order to minimize the color error.

Figure 5A:
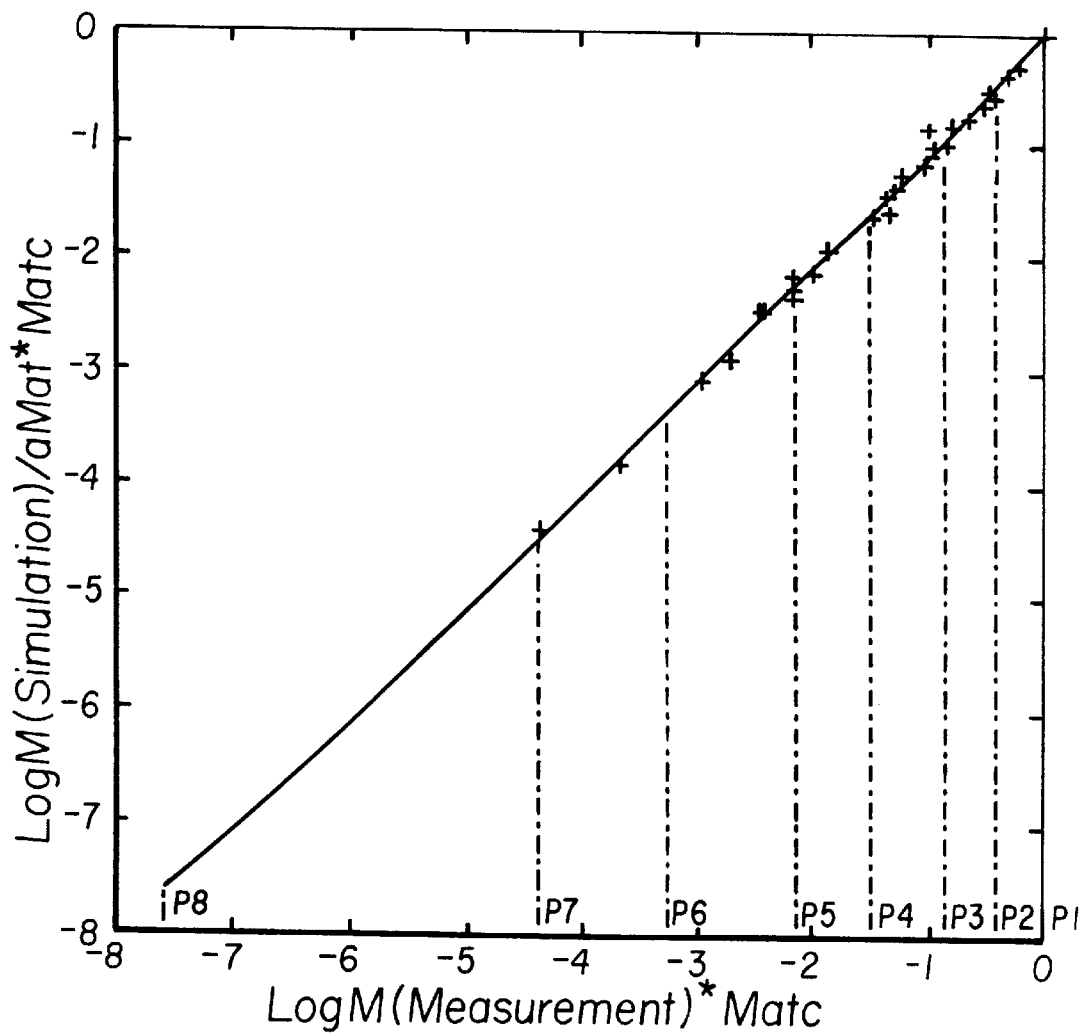
FIGS. 5(a)–5(c) illustrate profile tuning curves.
Figure 5B:
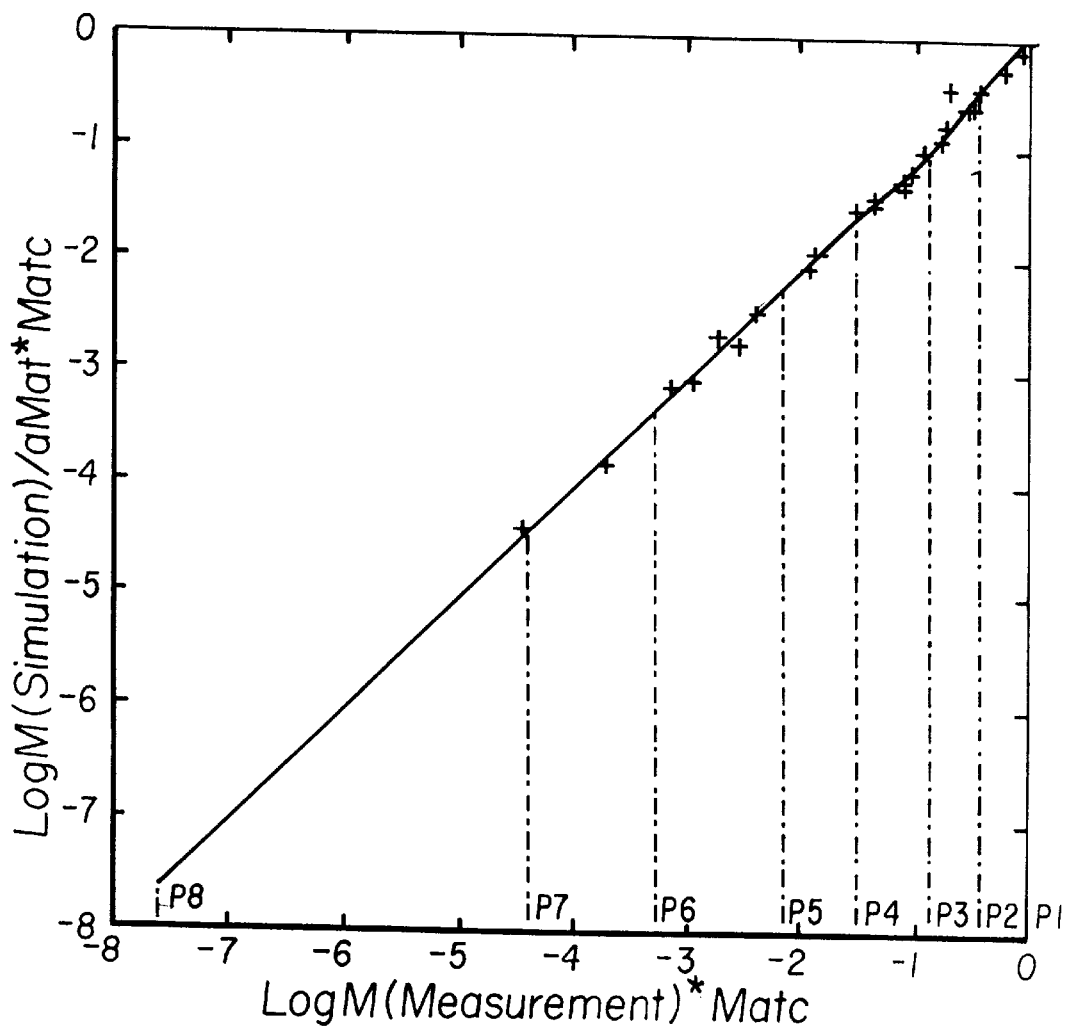
Figure 5C:
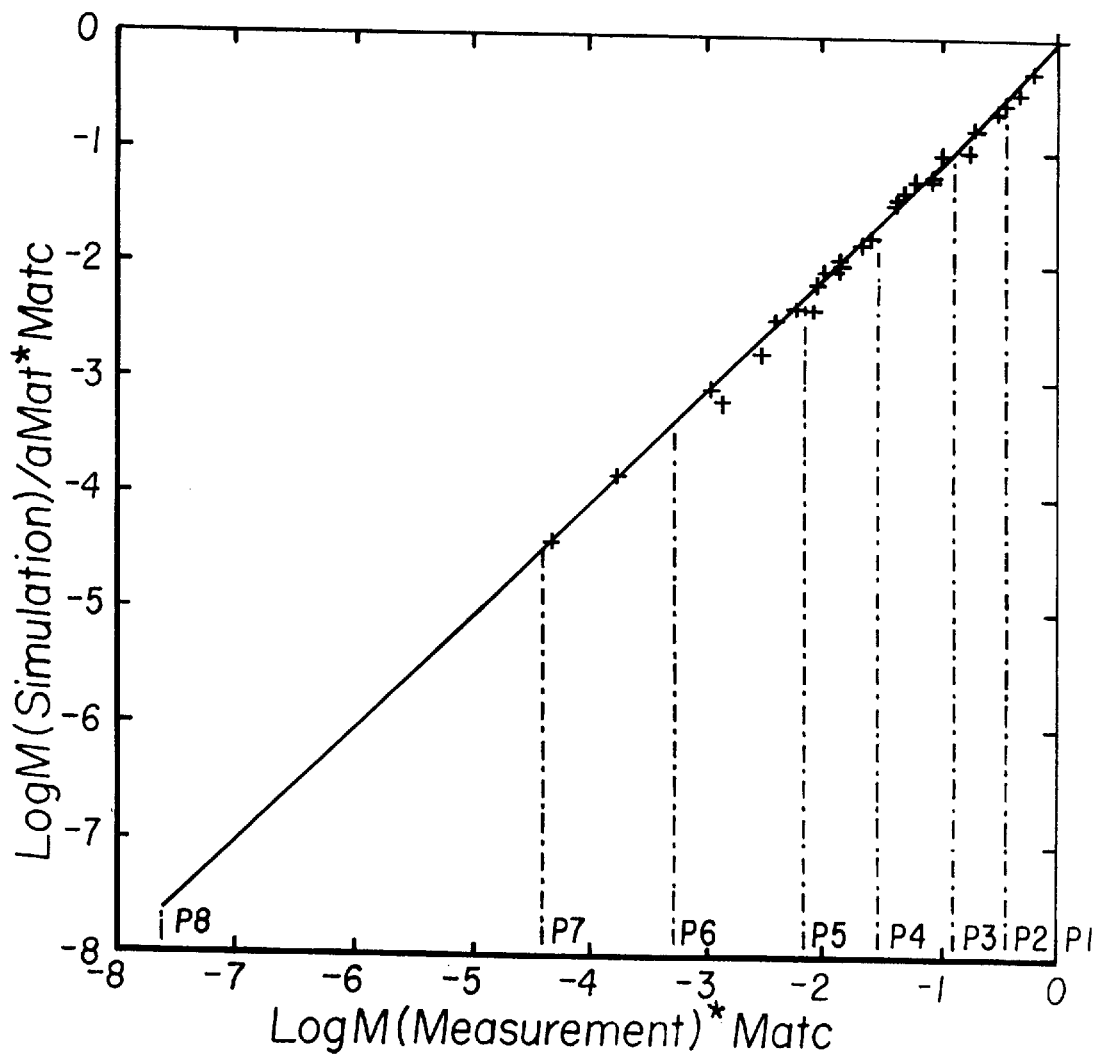

FIGS. 5(a), 5(b) and 5(c) provide a set of three plots showing the curve function for a particular run. The matrices previously noted are also associated with this run. The base profile used here was the generic profile for a Kodak x18600 printer. The run was based on measurements made from a 30-patch target measured with a hand-held calorimeter. In each plot, each of the +'s corresponds to a patch value. The solid line on each plot shows the curve for each component. The vertical semi-dotted lines show the values of the curve parameters which determine the curve. Each of these lines is labeled P1, P2, . . . P8. The values [$x_1$, . . . $x_n$] referred to in equation 21 correspond to the horizontal positions of the semi-dotted lines. The values [Yi,1 . . . Yi,n] referred to in equation 21 correspond to the heights of the semi-dotted lines. Each solid line is a cubic spline which goes through the pairs $(x_1 y_{i,1})$, $(x_2 y_{i,2})$, ... $(x_8 y_{i,8})$, where i goes from 1 to 3. The values $[Y_{i,1} \ldots y_{i,n}]$ are chosen so that the line comes as close as possible to going through the +'s. Note that each separate component has the same x values for the curve as the other components but different y values. Note also that on each plot P1 goes through (0,0) while P8 goes through (LogM(0),LogM(0)).

The method of the present invention can also be modified to make use of visual comparisons. Suppose a user has a computer with a monitor and suppose that PM is a profile characterizing that monitor. The monitor profile PM will contain a output transform PM_Out which maps a Lab value to the monitor RGB value required to produce that color. If P is a base profile, then the transformation chain P_Simulation•PM_Out can be used to display on the monitor a simulated version of what a picture would look like if it were printed. (This is the source of the term "simulation transform"). If the monitor and output profiles are accurate the simulation version of a picture will look like the printed version. If they are different, the operator can interactively create a transform H such that displaying a picture through the transform P-Simulation•H•PM_Out produces a picture which looks like the printed version of that picture.

The transform H can be any color transform typically used when editing pictures for color. For example, one well-known color transformation used by many commercially available applications allows an operator to modify transfer curves in the RGB space defined by the computer system's color monitor. When running such an application, the operator is shown a graph containing a red curve, a blue curve, and a green curve. The operator can adjust any of the three curves by moving it with his mouse. After each movement of the curves, the picture can be updated by mapping the red pixel values through the red curve, the green pixel values through the green curve, and the blue pixel values through the blue curve. This RGB-curve transformation can be converted into the transformation H described above through the use of a monitor profile defined for the computer system's color monitor. If MonitorProfile is the computer system's monitor's profile, and RGBCurve is the transformation defined by the operator, then the transform H can be defined by:

H=MonitorProfile_Out•RGBCurve•MonitorProfile_In

Once H is determined it can be used to create a tuning transformation F in one of two ways. If a formulation for H is known in closed form, it can be inverted to give F. Otherwise it can be used to generate a set of pseudomeasurements which can then be fed in the colorimeter-based algorithm described above. This can be done in the following way:
1) Pick an array of color values which cover Lab space.
2) Let $c_i$ be the i'th entry in an array of colors.
3) Define $meas_i$=H(P_Simulation($c_i$)).
4) As in the standard case, choose F to come as close as possible to satisfying F($meas_i$)=P_Simulation($c_i$) for all i.

A different modification of this method can allow an operator to adjust the grey component replacement (GCR) level of an output profile. Many output devices use four inks to produce color. For these devices it is possible to produce a given color in many different ways, since for most colors it is possible to add or subtract some amount of black ink and compensate by adjusting the amount of cyan, magenta, and yellow inks. Let D:CMYK→CMYK be a transformation which remaps the black channel, and roughly compensates by remapping C, M, and Y. The remapping of the K channel could be determined by an operator's decision to use more or less black ink at a given color. The rough compensation could be as simple as adding or subtracting equal amounts of CMY. Then a colorimetrically valid profile can be produced from the base profile by the following procedure:
1) Produce an intermediate profile PGCR by
   PGCR_Out=P_Out•D
   PGCR-In $D^{-1}$•P_In
   PGCR_Simulation=P_Simulation
2) Tune PGCR to produce a new profile Pnew. PGCR and therefore Pnew contain inking which obey the revised GCR levels.

The method can also be modified to tune input profiles. Input profiles contain two transforms—an input transform which maps from the device's color space to the reference color space, and an output transform which inverts the input transform. Methods currently exist for people to generate input profiles for their scanners, but such methods require the use of a premeasured target containing a large number of patches. Since the values in an input profile depend on the dyes used in the object being scanned as well as depending on the scanner, a person who wishes to scan an unusual film type can have problems generating an accurate profile. It is possible to generate an improved input profile for a device and medium type by
1) Creating a base input profile on a type of conventional film or paper which is like the desired medium
2) Creating a patch target on the medium
3) Measuring those patches with a calorimeter
4) Scanning the patch
5) Finding F to fit
   F($meas_i$)=P_In($c_i$)
   Pnew_In=P_In•F
   Pnew_Out=$F^{-1}$•P_Out The present invention provides several distinct advantages. The chief advantage of tuning an output profile over creating a profile from scratch is that the tuning process is faster and easier. Because the tuning process modifies an existing profile it does not need to perform as much computation and so will run faster. Furthermore, the simpler model used for tuning requires fewer patches. The time required to make measurements is a significant proportion of the total time required to produce a new profile, especially for less skilled operators and especially for operators who own hand-held measurement devices In theory tuning an existing profile should not produce as accurate a result as recomputing the profile from scratch. However there are two reasons why it may, in fact, be more accurate in practice. The first is that the smaller number of patches it requires provide fewer opportunities for operator error. Even if the operator does mis-measure a patch, the base profile can be used as a make sure that large errors are caught. The second reason tuning can lead to more accurate profiles is that people will do it more often than they would do a complete re-characterization.

The method discussed here computes a color transform which modifies the front end of the output transform. One could also, tune by modifying the back end of the transform so as to re-linearize the device. The reason this is not practical is that there is no way to determine aim points from an arbitrary profile.

Other types of tuning transforms or parametric function can be used instead of the combination of matrices and spline based curves discussed herein. The model should be simple, should be governed by only a few parameters, should be easy to invert and should exhibit regular behavior and the end points should go through the end points previously discussed. For example, the curves could be based on a second order polynomial instead of the spline, with the coefficients being the parameters to be fit. Or the matrices and curves could be applied in some other space besides log normalized XYZ.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

REFERENCE NUMBER LIST

8 System
10 Profile storage
12 Computer
14 Output device
16 Color patch target
18 Iolor measurement device
20 Input device
30 Base profile
40–46 Operations steps
70 Tuned profile
80–96 Operation steps
110–128 Operation steps

What is claimed is:

1. A method of adjusting a color output device characterization, comprising:
    printing a set of patches from test colors using the characterization;
    measuring colorimetric values of the patches; and
    remapping inputs to an output transformation of the characterization responsive to the colorimetric values and predicted values for the colorimetric values producing an adjusted device characterization.

2. A method of adjusting a color input device characterization, comprising:
    measuring colorimetric values from a set of test patches;
    scanning the patches and using the characterization to convert the scanned values to colorimetric form; and
    remapping outputs of an input transformation of the characterization responsive to the colorimetric scanned values and predicted values for the colorimetric scanned values producing an adjusted device characterization.

3. A method of adjusting a base profile designated for an output color device that includes an output profile and a simulation profile, comprising:
    selecting a set of test colors;
    generating color patches with the output color device using the test colors and the output profile;
    measuring colorimetric color values for the patches;
    producing simulation color values using the simulation transform and the test colors;
    determining a transform which maps the colorimetric color values to the simulation color values for each of the patches; and
    combining the transform, the base profile and an inverse of the transform to produce an adjusted base profile.

4. A method as recited in claim 3, performing a gamut remapping to map the colorimetric color values into a gamut defined by the base profile.

5. A method of adjusting a base profile designated for an output color device, comprising:
    selecting a color picture image;
    outputting the image with the output color device using the base profile;
    displaying the image for review by a user;
    interactively creating a modifying transform by the user which modifies the displayed image to visually match the picture image;
    determining an inverting transform that inverts the modifying transform; and
    combining the inverting transform, the base profile and the inverse of the inverting transform to produce an adjusted base profile.

6. A method of adjusting inking levels in a profile designated for an output color device having at least four inks and a simulation transform, comprising:
    creating an intermediate profile by applying an inking transformation and an inverse of the inking transformation to input and output transforms;
    selecting a set of colors;
    generating a set of color patches from the set of colors with the output color device using the intermediate profile;
    measuring colorimetric color values for the patches;
    producing simulation color values from the set of colors using the simulation transform;
    determining a mapping transform which maps the colorimetric color values to the simulation color values for the patches; and
    combining the mapping transform, the intermediate transform and an inverse of the mapping transform into an adjusted profile.

7. A method of adjusting a base input profile designated for a color input device, comprising:
    scanning a set of color patches;
    determining a base color values for the patches using the base input profile;
    measuring colorimetric color values of the patches;
    determining a mapping transform which maps the colorimetric color values to the base color values; and
    combining the mapping transform, the base input profile and an inverse of the mapping transform to produce an adjusted base input profile.

* * * * *